3,014,025
Patented Dec. 19, 1961

3,014,025
METHOD OF REDUCING AND HYDROGENATING CHEMICAL COMPOUNDS BY REACTION WITH SOLUTIONS OF ALKALI METAL BOROHYDRIDES
Richard K. Pearson, Zelienople, Pa., George W. Benz, Middletown, N.Y., and Roy M. Adams, Darlington, Pa., assignors to Callery Chemical Company, Pittsburgh, Pa., a corporation of Pennsylvania
No Drawing. Filed Mar. 4, 1955, Ser. No. 492,315
7 Claims. (Cl. 260—205)

This invention relates to methods of reducing and hydrogenating chemical compounds by reaction of said compounds with a solution of an alkali metal borohydride in a polyethylene glycol dialkyl ether.

The alkali metal borohydrides which are used in this invention were discovered by Schlesinger and Brown and various methods of preparation and use of these compounds are described at numerous points in current literature. In Schlesinger and Brown Patent 2,683,721 there is described a number of methods of reducing and hydrogenating organic compounds by reaction with alkali metal borohydrides. In this patent there are described processes for carrying out reduction and hydrogenation reactions using slurries of alkali metal borohydrides and also using solutions of these borohydrides in various ether and amine solvents. Other experimental work, however, has shown that there are a large number of organic reduction reactions which could not be performed using the alkali metal borohydrides in the manner described by Schlesinger and Brown. For example, it was found that while the alkali metal borohydrides would reduce acid chlorides quite readily they were completely unreactive toward alkyl halides and other halogenated hydrocarbons. Similarly it was found that the alkali metal borohydrides were completely unreactive toward nitro groups, alkoxy groups, and organic sulfides.

Accordingly, it is one object of this invention to provide a new and improved method for carrying out reduction type reactions using alkali metal borohydrides in a manner which results in the reduction of compounds containing functional groups which are not reducible by borohydrides under other reaction conditions.

Another object of this invention is to provide a new and improved method for reducing organic compounds by reaction with solutions of alkali metal borohydrides in polyethylene glycol dialkyl ethers.

Other objects will become apparent from time to time throughout the specification and claims as hereinafter related.

This invention is based upon our discovery that when alkali metal borohydride are dissolved in polyethylene glycol dialkyl ethers the solutions formed are much more reactive than solutions of borohydrides in other solvents. The solutions of the alkali metal borohydrides in polyethylene glycol dialkyl ethers are so highly reactive that they are capable of reducing numerous functional groups which cannot be reduced by the borohydrides in solution in other solvents or in suspension in other liquid reaction media. For example, we have found that the alkali metal borohydrides in solution in or in the presence of substantial quantities of polyethylene glycol dialkyl ethers will reduce such functional groups as the halogen in alkyl halides, nitro groups, organic sulfides, esters, acetal group, and silicon analogues of reducible organic compounds. It has also been found that in solution in the polyethylene glycol dialkyl ethers the borohydrides react more rapidly and in higher yield with compounds which can be reduced in other solvents. For example, the reduction of esters has been found to take place much more rapidly in polyethylene glycol dialkyl ethers than in other solvents or other liquid reaction media.

In one experiment 50 millimols of sodium borohydride was dissolved in tetraethylene glycol dimethyl ether in a reaction flask and the solution frozen with liquid nitrogen. The reaction flask was connected to a Dry Ice reflux condenser and to a vacuum system. The system and flask were evacuated and 50 millimols of methyl chloride were condensed on the frozen sodium borohydride solution. The reaction flask was allowed to warm to room temperature and the volatile gases allowed to expand into the vacuum system where they were separated and analyzed. The reaction mixture was filtered to separate the solid and liquid fractions which were then analyzed. The volatile reaction products showed that 54% of the methyl chloride had reacted with the sodium borohydride and that 67% of the methyl chloride reacted was recovered as methane. The other volatile products of the reaction were diborane and hydrogen. The solid residue from the reaction consisted essentially of sodium chloride. The analysis of the reaction products establishes that the methyl chloride was reduced according to the reaction:

$$NaBH_4 + CH_3Cl \rightarrow NaCl + CH_4 + \tfrac{1}{2} B_2H_6$$

A similar reaction was carried out using methyl bromide in place of methyl chloride and the reaction proceeded by the same apparent mechanism. The principal products of reaction were methane, diborane, hydrogen, and sodium bromide.

In another experiment carbon tetrachloride was added to a solution of sodium borohydride in diethylene glycol dimethyl ether at room temperature and atmospheric pressure. The gaseous products were swept from the reaction flask using a nitrogen sweep and were collected in cold traps. The excess carbon tetrachloride was removed from the reaction products by distillation under reduced pressure. An analysis of the volatile reaction products showed the formation of diborane, hydrogen, methylene dichloride, methane and methyl chloride. The solid residue in the reaction flask consisted essentially of sodium chloride. The analysis of the reaction products indicated that the carbon tetrachloride was reduced by the sodium borohydride by a reaction mechanism similar to that described for the reduction of methyl chloride. In another series of experiments carbon tetrabromide was reduced by solutions of sodium borohydride in diethylene glycol dimethyl ether and also in ethylene glycol dimethyl ether. In each case the reaction was much more vigorous than the reaction with carbon tetrachloride or with methyl chloride. The volatile products of this reaction consisted essentially of diborane, methane, hydrogen and a mixture of alkyl halides.

Another series of experiments was run testing the reaction of sodium borohydride in various glycol ethers (including ethylene glycol dimethyl ether, diethylene glycol diemthyl ether, triethylene glycol dimethyl ether, and tetraethylene glycol dimethyl ether) with various alkyl and aryl halides to determine whether or not any reaction would take place. In most cases the reaction was merely observed by noting the evolution of gas but without attempting to characterize the reaction products. Some of the organic halides tested were ethyl chloride, n-propyl chloride, n-butyl chloride, methylene dichloride, chloroform, hexachloroethane, 1,2 dichloroethane, 1,1 dichloroethane, 1,1,1 trichloroethane, hexachloro benzene, methyl bromide, ethyl bromide, isopropyl bromide, bromoform, 1,2 dibromoethane, 1,4 dibromobutane, and triphenyl bromoethane. As a result of these experiments the following general observations were made. In general, the bromides are more reactive than the chlorides. Branching or increasing the carbon chain length tends to decrease the reactivity of the monohalide compounds.

Compounds which contain two halogens attached to the same carbon atom are much less reactive toward sodium borohydride. However, compounds containing one, three of four halogen atoms per carbon atom are quite reactive toward sodium borohydride. Aromatic, alicyclic, and heterocyclic halides are much less reactive toward sodium borohydride.

In another experiment a solution of sodium borohydride in tetraethylene glycol dimethyl ether was placed in a flask under a nitrogen atmosphere and refluxed with ethyl acetate at atmospheric pressure. As the ester was consumed the temperature rose slowly from about 130° to 190° C. At the end of the heating period any volatile materials or excess ester was pumped off while heating the reaction mixture. The reaction intermediate was then hydrolyzed with sulfuric acid. The unreacted hydride in the residue was determined by measuring the hydrogen evolved, and the ethanol-water mixture produced by the hydrolysis was removed by pumping and fractionated in a micro-fractionation column at laboratory atmospheric pressure. The boiling point and refractive index of the water-ethanol reaction product was used to identify the product. A 60% yield of ethanol based on the acetate was obtained in the reaction. When this reaction is carried out in the manner indicated in solution in polyethylene glycol dimethyl ethers the time required for carrying the reaction substantially to completion (1.5 hrs.) is only about ⅓ that required for the reduction of esters without solvent or in any of the solvents mentioned in the prior art.

In another experiment nitrobenzene was heated with a solution of sodium borohydride in diethylene glycol dimethyl ether. The reaction product was separated from the solution and identified as azobenzene, thus indicating that a partial reduction of the nitro group had taken place.

Other experiments have shown that when dissolved in one of the polyethylene glycol dialkyl ethers sodium borohydride will reduce methylal to methane and methanol; will reduce ethyl silicate to ethanol and silane; will reduce trichloro vinyl silane to silane; will reduce silicon tetrachloride to silane; and reacts vigorously with carbon disulfide to produce reaction products which have not yet been fully characterized.

Other experiments have shown that in addition to the reactions above reported sodium borohydride when dissolved in polyethylene glycol dialkyl ethers will reduce aldehydes, ketones and similar functional groups more rapidly and in better yield than when dissolved in other solvents such as liquid ammonia, amines, alcohols or water.

The term alkali metal borohydrides as used herein is intended to cover compounds having the formula $$MBH_{4-x}A_x$$

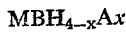

where M is an alkali metal, $x$ is a number from 0 to 3, and A is an atom or functional group which is relatively inert with respect to the reducing characteristics of the hydridic hydrogen in the compound.

From the foregoing description it is apparent that when reduction reactions utilizing alkali metal borohydrides are carried out in polyethylene glycol dialkyl ethers it is possible to reduce a much wider variety of compounds than may be reduced in other solvents or in the absence of a solvent.

While we have described the best mode of practicing our invention which is known to us it is to be understood that within the scope of the appended claims this invention may be practiced otherwise than as specifically described.

Having thus described our invention according to the patent laws what we desire to claim and secure by Letters Patent of the United States is:

1. A method of reducing compounds of the group consisting of organic compounds and silicon analogues containing a reducible functional group which comprises reacting the compound with a solution of an alkali metal borohydride in an ether of the class $CH_3O(C_2H_4O)_xCH_3$, where $x$ is an integer from 1 to 4, at a temperature sufficient to cause a chemical reaction but sufficiently low that none of the reactants or reaction products thermally decompose during the reduction.

2. A method according to claim 1 in which said alkali metal borohydride is sodium borohydride.

3. A method according to claim 1 in which the functional group which is reduced is a nitro group.

4. A method according to claim 1 in which the functional group reduced is an alkoxy group.

5. A method according to claim 1 in which the compound reduced is carbon disulfide.

6. A method according to claim 1 in which the compound reduced is a halogenated hydrocarbon.

7. A method according to claim 1 in which the compound reduced is an ester.

References Cited in the file of this patent

UNITED STATES PATENTS 2,683,721    Schlesinger et al. _____ July 13, 1954

OTHER REFERENCES

Chaikin et al.: Jour. Amer. Chem. Soc., 71, pp. 122–5 (1949).

Bulletin 401A "Lithium Aluminum Hydride," of Metal Hydrides, Inc., Beverly, Mass. (1951).